(12) United States Patent
Park et al.

(10) Patent No.: US 10,276,902 B2
(45) Date of Patent: Apr. 30, 2019

(54) SECONDARY BATTERY HAVING IMPROVED SAFETY

(71) Applicant: LG Chem, Ltd., Seoul (KR)

(72) Inventors: Jong-Pil Park, Daejeon (KR);
Jong-Hun Kim, Daejeon (KR);
Jung-Hoon Yang, Daejeon (KR);
Young-Suk Cho, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/554,340

(22) PCT Filed: Apr. 22, 2016

(86) PCT No.: PCT/KR2016/004249
§ 371 (c)(1),
(2) Date: Aug. 29, 2017

(87) PCT Pub. No.: WO2016/171517
PCT Pub. Date: Oct. 27, 2016

(65) Prior Publication Data
US 2018/0053976 A1 Feb. 22, 2018

(30) Foreign Application Priority Data

Apr. 22, 2015 (KR) .................. 10-2015-0056818

(51) Int. Cl.
*H01M 10/647* (2014.01)
*H01M 4/02* (2006.01)
(Continued)

(52) U.S. Cl.
CPC ....... *H01M 10/647* (2015.04); *H01M 2/0212* (2013.01); *H01M 2/08* (2013.01);
(Continued)

(58) Field of Classification Search
CPC combination set(s) only.
See application file for complete search history.

(56) References Cited

U.S. PATENT DOCUMENTS 6,631,072 B1 * 10/2003 Paul .................. H01G 9/008
361/502
8,518,575 B2 * 8/2013 Chung .................. H01M 2/021
429/121
(Continued)

FOREIGN PATENT DOCUMENTS

EP 2317589 A1 5/2011
EP 2950371 A1 12/2015
(Continued)

OTHER PUBLICATIONS

Search report from International Application No. PCT/KR2016/004249, dated Aug. 3, 2016.
(Continued)

*Primary Examiner* — Kaity V Chandler
(74) *Attorney, Agent, or Firm* — Lerner, David, Littenberg, Krumholz & Mentlik, LLP

(57) ABSTRACT

A pouch type secondary battery includes an electrode assembly and a pouch sheath material including a first pouch portion and a second pouch portion. The pouch-type secondary battery includes dual electrode leads wherein a first electrode lead is attached to the first pouch portion and a second electrode lead is attached to the second pouch portion. In the pouch-type secondary battery, electric current is interrupted by using a volumetric swelling phenomenon caused by swelling or pressure generated upon overcharge so that the battery may be prevented from being further charged. In addition, when pressure is increased by an additional reaction, venting occurs toward the inner lead portion of each of the dual electrode leads. As a result, it is (Continued)

possible to increase the stability of a battery cell, module and a pack received in the pouch, and thus to improve the life of a battery.

6 Claims, 3 Drawing Sheets

(51) Int. Cl.
    *H01M 4/13*     (2010.01)
    *H01M 2/08*     (2006.01)
    *H01M 2/02*     (2006.01)
    *H01M 2/12*     (2006.01)
    *H01M 2/34*     (2006.01)
    *H01M 2/22*     (2006.01)

(52) U.S. Cl.
    CPC ........... *H01M 2/1241* (2013.01); *H01M 2/22* (2013.01); *H01M 2/345* (2013.01); *H01M 4/02* (2013.01); *H01M 4/13* (2013.01); *H01M 2004/021* (2013.01); *H01M 2200/20* (2013.01)

(56) References Cited

U.S. PATENT DOCUMENTS

| | | | | |
|---|---|---|---|---|
| 8,669,003 B2* | 3/2014 | Choi | ............ | H01M 2/021 429/163 |
| 8,778,531 B2* | 7/2014 | Lee | ............ | H01M 2/021 429/175 |
| 8,999,566 B2* | 4/2015 | Chung | ............ | H01M 2/06 429/121 |
| 9,590,225 B2* | 3/2017 | Kim | ............ | H01M 2/30 |
| 2006/0115717 A1* | 6/2006 | Schubert | ............ | H01M 2/0257 429/124 |
| 2007/0026302 A1 | 2/2007 | Yoon | | |
| 2010/0266881 A1* | 10/2010 | You | ............ | H01M 2/0277 429/56 |
| 2011/0086242 A1* | 4/2011 | Lee | ............ | H01M 2/021 429/7 |
| 2011/0244312 A1* | 10/2011 | Tani | ............ | H01M 2/26 429/163 |
| 2012/0040235 A1* | 2/2012 | Cho | ............ | H01M 2/0207 429/156 |
| 2012/0202105 A1* | 8/2012 | Shinyashiki | ............ | H01M 2/22 429/153 |
| 2013/0216870 A1* | 8/2013 | Kim | ............ | H01M 2/0426 429/61 |
| 2013/0337300 A1 | 12/2013 | Saito | | |
| 2013/0344379 A1* | 12/2013 | Yang | ............ | H01M 2/348 429/158 |
| 2014/0011060 A1 | 1/2014 | Yang et al. | | |
| 2016/0028068 A1 | 1/2016 | Yang et al. | | |
| 2016/0276647 A1* | 9/2016 | Lee | ............ | H01M 2/34 |
| 2016/0315301 A1* | 10/2016 | Kim | ............ | H01M 2/1241 |
| 2017/0040635 A1* | 2/2017 | Choi | ............ | B23K 20/129 |

FOREIGN PATENT DOCUMENTS

| | | |
|---|---|---|
| JP | 2001068090 A | 3/2001 |
| KR | 20040023964 A | 3/2004 |
| KR | 20070013568 A | 1/2007 |
| KR | 101192077 B1 | 10/2012 |
| KR | 20130014253 A | 2/2013 |
| KR | 20130117637 A | 10/2013 |
| KR | 101472167 B1 | 12/2014 |
| KR | 20140139793 A | 12/2014 |
| KR | 20150033381 A | 4/2015 |
| WO | 2015046878 A1 | 4/2015 |

OTHER PUBLICATIONS

Extended European Search Report for EP16783449 dated Dec. 5, 2017.

* cited by examiner

SECONDARY BATTERY HAVING IMPROVED SAFETY

CROSS-REFERENCE TO RELATED APPLICATIONS

The present application is a national phase entry under 35 U.S.C. § 371 of International Application No. PCT/KR2016/004249, filed Apr. 22, 2016, published in Korean, which claims the benefit of Korean Patent Application No. 10-2015-0056818, filed Apr. 22, 2015, with the Korean Intellectual Property Office, all of which are incorporated herein by reference.

TECHNICAL FIELD

The present disclosure relates to a secondary battery having improved safety. More particularly, the present disclosure relates to a secondary battery having improved safety of a cell, module and a pack by modifying the structure of electrode leads of a cathode/anode to interrupt electric current by volumetric swelling caused by swelling or pressure upon overcharge of a secondary battery.

BACKGROUND ART

Secondary batteries, including a lithium ion secondary battery, lithium ion polymer battery and a super capacitor (electrical double layer capacitor and pseudo-capacitor), have undergone a change in market demand into development of a battery having low weight, high energy density and high capacity, as the consumer's need has been changed by digitalization and high performance conversion of electronic appliances. In addition, development of hybrid electric vehicles, electric vehicles and fuel cell vehicles have been conducted actively to handle the future energy and environment problems, and thus scale-up of batteries as power supply sources for vehicles has been required.

Secondary batteries are those capable of being charged and discharged and may be classified into nickel-cadmium (Ni—Cd) batteries, nickel-metal hydride (Ni-MH) batteries, lithium (Li) secondary batteries, or the like. Among those, lithium secondary batteries are significantly advantageous in that they have a higher driving voltage and energy density per unit weight as compared to the other secondary batteries.

In general, a secondary battery has a structure in which a separator is inserted between a cathode and an anode to form an electrode assembly, an electrolyte is injected thereto and the resultant electrode assembly is sealed in a casing. The electrode assembly may be classified into a jelly-roll type electrode assembly formed by applying an electrode active material onto both surfaces of elongated sheet-like collector foil to form a cathode and an anode, inserting a separator between the cathode and anode, and winding the resultant electrode assembly; and a stack type electrode assembly formed by applying an electrode active material onto both surfaces of collector foil having a predetermined unit size and stacking multiple cathodes and anodes successively with a separator inserted therebetween. Secondary batteries may also be classified, depending on the shape of an electrode assembly enclosed in a battery casing, into a cylindrical battery including an electrode assembly enclosed in a cylindrical metallic can, a prismatic battery including an electrode assembly enclosed in a prismatic metallic can and a pouch type battery including an electrode assembly enclosed in a pouch-like casing made of an aluminum laminate sheet.

Meanwhile, lithium secondary batteries forming a main part of secondary batteries are disadvantageous in that they have low safety. For example, when a battery is overcharged to about 4.5V or higher, a cathode active material may be decomposed, lithium metal dendrite may grow on an anode and decomposition of an electrolyte may occur. During this, heat emission occurs to accelerate the above-mentioned decomposition reactions and several side reactions, resulting in ignition and explosion of the battery. In addition, when a lithium secondary battery is charged first after being sealed, a large amount of gas is generated inside of the battery. Such gas generation causes generation of bubbles between an electrode and a polymer electrolyte layer, resulting in rapid degradation of the quality of a battery due to contact inferiority.

Therefore, some attempts have been made to solve the above-mentioned problems by adding an additive to an electrolyte or providing a battery with a device, such as a current interruptive device (CID), to interrupt electric current and to release internal pressure upon the abnormal operation of a secondary battery. However, such an additive adversely affects the quality of a secondary battery and the device, such as CID, causes an increase in manufacturing cost of a secondary battery and makes the manufacturing process complicated.

Under these circumstances, there is a need for developing a pouch-type secondary battery which can improve the safety upon overcharge.

DISCLOSURE

Technical Problem

The present disclosure is designed to solve the problems of the related art, and therefore the present disclosure is directed to providing a secondary battery which can be prevented from overcharge and thus has improved safety.

Technical Solution

In one aspect of the present disclosure, there is provided a pouch-type secondary battery, including: an electrode assembly; and a pouch sheath material configured to receive the electrode assembly and including a first pouch portion and a second pouch portion, wherein the first pouch portion and the second pouch portion are adhered to each other by each sealing portion, the pouch-type secondary battery further including: a first electrode lead extended from the electrode assembly and attached to the first pouch portion; a second electrode lead attached to the second pouch portion and protruding out of the exterior of the pouch sheath material; a first sealing member interposed between the first electrode lead and the second electrode lead to prevent the first electrode lead and the second electrode lead from being in contact with each other; and a film-like connection member configured to connect the first electrode lead electrically with the second electrode lead.

According to an embodiment of the present disclosure, one terminal end of the film-like connection member may be attached to the first electrode lead and the other terminal end thereof may be attached to the second electrode lead.

According to another embodiment of the present disclosure, the film-like connection member may be flexible.

According to still another embodiment of the present disclosure, when the internal pressure of the pouch sheath material exceeds a critical value, a portion where one terminal end of the film-like connection member is attached to the first electrode lead or a portion where the other terminal end of the film-like connection member is attached to the second electrode lead may be separated by the pressure.

According to still another embodiment of the present disclosure, when the internal pressure of the pouch sheath material exceeds a critical value, a predetermined portion of the film-like connection member may be broken by the pressure.

According to still another embodiment of the present disclosure, when the internal pressure of the pouch sheath material exceeds a critical value, the first sealing member may be broken by the pressure.

According to still another embodiment of the present disclosure, the first sealing member may be disposed at the outside of the pouch-type secondary battery as compared to the film-like connection member.

According to still another embodiment of the present disclosure, the pouch-type secondary battery may further include a second sealing member disposed at the inside of the pouch-type secondary battery as compared to the film-like connection member, and interposed between the first electrode lead and the second electrode lead in order to prevent the first electrode lead and the second electrode lead from being in contact with each other.

According to still another embodiment of the present disclosure, when the internal pressure of the pouch sheath material exceeds a critical value, the second sealing member may be broken by the pressure.

According to yet another embodiment of the present disclosure, the pouch-type secondary battery may further include a third sealing member formed between the first pouch portion and the first electrode lead and between the second pouch portion and the second electrode lead, respectively.

Advantageous Effects

The present disclosure gives the following effects. The pouch type secondary battery according to the present disclosure includes an electrode assembly, and a pouch sheath material including a first pouch portion and a second pouch portion. The pouch type secondary battery has dual electrode leads by forming a first electrode lead in the first pouch portion and a second electrode lead in the second pouch portion. Thus, in the pouch type secondary battery, electric current is interrupted by using a volumetric swelling phenomenon caused by swelling or pressure generated upon overcharge so that the battery may be prevented from being further charged. In addition, when pressure is increased by an additional reaction, venting occurs toward the internal lead portion of each of the dual electrode leads. As a result, it is possible to increase the stability of a battery cell, module and a pack received in the pouch, and thus to improve the life of a battery.

DESCRIPTION OF DRAWINGS

The accompanying drawings illustrate preferred embodiments of the present disclosure and together with the following detailed description, serve to provide further understanding of the technical features of the present disclosure, and thus, the present disclosure is not construed as being limited to the drawings.

DESCRIPTION OF MAIN ELEMENTS

Figure 1:
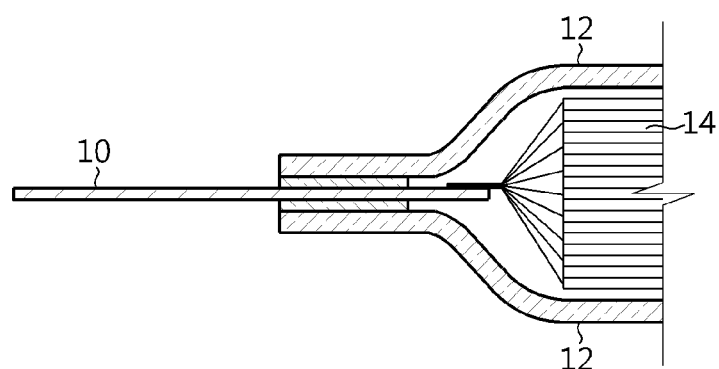
FIG. 1 shows the structure of a conventional electrode lead portion.

10: Electrode lead
11: First sealing member 11': Second sealing member
12: Pouch sheath material
13: Film-like connection member
14: Inner cell
15: Third sealing member.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In one aspect of the present disclosure, there is provided a pouch-type secondary battery, including: an electrode assembly; and a pouch sheath material configured to receive the electrode assembly and including a first pouch portion and a second pouch portion, wherein the first pouch portion and the second pouch portion are adhered to each other by each sealing portion, the pouch-type secondary battery further including: a first electrode lead extended from the electrode assembly and attached to the first pouch portion; a second electrode lead attached to the second pouch portion and protruding out of the exterior of the pouch sheath material; a first sealing member interposed between the first electrode lead and the second electrode lead to prevent the first electrode lead and the second electrode lead from being in contact with each other; and a film-like connection member configured to connect the first electrode lead electrically with the second electrode lead.

When a secondary battery is overcharged, decomposition of an electrolyte occurs at the cathode and lithium metal is precipitated at the anode. Thus, the characteristics of the battery are deteriorated and gas is generated due to the heat emission or ignition of the electrodes. The internal pressure of the battery is increased rapidly by gas generation caused by the decomposition of the electrolyte due to overvoltage and a swelling phenomenon occurs so that the battery may billow.

To solve the above-mentioned problem, the secondary battery according to an embodiment of the present disclosure includes a structure by which electrode leads including a cathode lead and an anode lead are connected doubly.

Therefore, the swelling force inside of a cell derived from the gas generated by vaporization of an electrolyte during the overcharge of the secondary battery converges on the relatively weak connection member of the dual electrode leads. Then, the connection member portion of the dual electrode leads is separated or broken by the converging force to interrupt a charging current, thereby preventing the battery from being further charged.

In addition, when the pressure of the secondary battery is increased more by an additional reaction, the first sealing member interposed between the first electrode lead and the second electrode lead is broken so that venting may occur toward the exterior of the casing of the pouch-type battery. Therefore, it is possible to increase the stability of the battery cell, module and pack received in the pouch.

FIG. 1 shows the structure of a conventional electrode lead portion.

In general, as shown in FIG. 1, the conventional electrode lead includes a pouch sheath material 12 configured to receive an electrode lead 10 and an inner cell 14. The electrode lead 10 is connected to the pouch sheath material 12 by way of a sealing portion, and is partially exposed to the exterior of the pouch sheath material 12.

Figure 2:
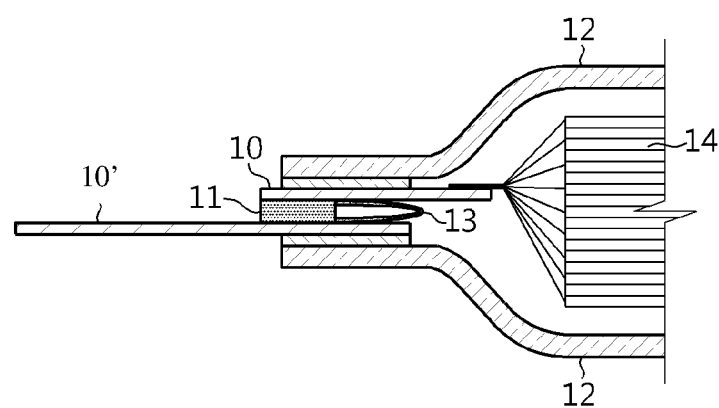
FIG. 2 shows the structure of a dual connected electrode lead portion according to an embodiment of the present disclosure.

According to the present disclosure, as shown in FIG. 2, electrode leads 10, 10' have an improved structure in which they are connected to each other by way of a film-like connection member 13 configured to make an electric connection between the leads. In other words, according to the present disclosure, the pouch-type secondary battery includes an electrode assembly, and a pouch sheath material including a first pouch portion and a second pouch portion, wherein a first electrode lead 10 is attached to the first pouch portion and a second electrode lead 10' is attached to the second pouch portion.

To allow normal operation of the battery, the first electrode lead 10 and the second electrode lead 10' should be connected electrically to each other. However, according to the present disclosure, the first electrode lead 10 and the second electrode lead 10' are not in direct contact with each other due to the first sealing member 11 interposed between both electrode leads. Thus, according to the present disclosure, a film-like connection member 13 is used to connect the first electrode lead 10 and the second electrode lead 10' electrically to each other.

In a normal state, the first electrode lead and the second electrode lead are in electric contact with each other by the film-like connection member 13 so that the battery may be operated normally.

Herein, as shown in FIG. 2, one terminal end of the film-like connection member 13 is attached to the first electrode lead 10 and the other terminal end of the film-like connection member 13 is attached to the second electrode lead 10'.

As shown in FIG. 2, the film-like connection member 13 may be made of a conductive flexible metallic or non-metallic material so that a curved surface may be formed.

Herein, any material, such as a metallic film, conductive polymer film or conductive inorganic film, may be used for the film-like connection member 13 with no particular limitation, as long as it has conductivity.

Meanwhile, referring to the method for connecting the first electrode lead and the second electrode lead electrically with each other, when they are connected electrically by adhering a predetermined portion of a site where the electrodes face through welding, the welding portion may be damaged by the vibrational impact applied to the secondary battery. In this case, the electrical connection between the first electrode lead and the second electrode lead is broken, and thus current flow may be interrupted during normal operation of the battery.

However, when the first and the second electrode leads 10, 10' are connected electrically with each other by way of the film-like connection member 13 according to the present disclosure, the film-like connection member 13 shows a buffering function capable of alleviating the impact even when vibration impact is applied during normal operation of the battery. Therefore, possibility that the electrical connection between the electrode leads 10, 10' is broken can be reduced significantly.

Figure 3:
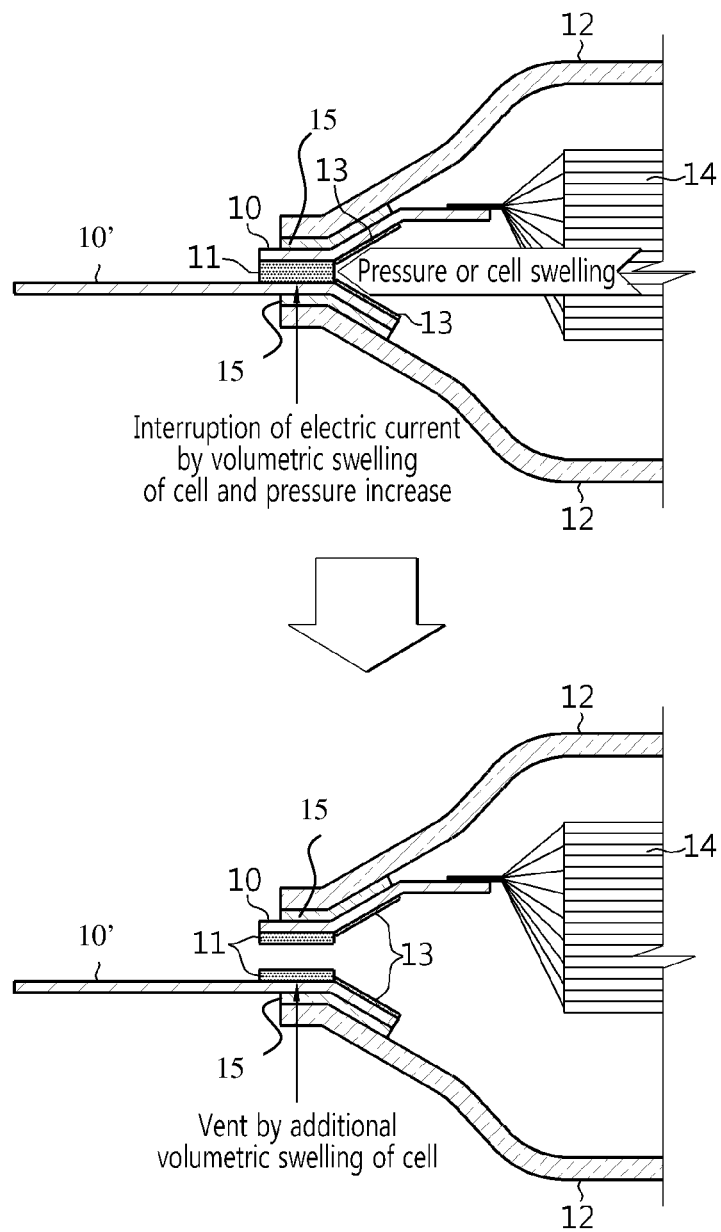
FIG. 3 shows interruption of electric current upon overcharge of a secondary battery according to an embodiment of the present disclosure and a venting mechanism occurring upon the swelling caused by an additional reaction.

FIG. 3 shows interruption of electric current upon overcharge of a secondary battery according to an embodiment of the present disclosure and a venting mechanism occurring upon the swelling caused by an additional reaction.

Referring to FIG. 3, the inner part of the pouch sheath material 12 swells due to the gas generated by the vaporization of an electrolyte during the overcharge of a secondary battery, and the swelling force converges on the film-like connection member 13 having relatively low strength in the electrode leads 10, 10'. The force converging on the film-like connection member 13 breaks a predetermined portion of the film-like connection member 13 to interrupt a charging current, thereby preventing the battery from being further charged.

Herein, when the internal pressure of the pouch sheath material 12 exceeds a critical value, the film-like connection member 13 may be broken at a predetermined portion by the pressure.

Although it is not shown, when the internal pressure of the pouch sheath material 12 exceeds a critical value, a portion where one terminal end of the film-like connection member having relatively low strength is attached to the first electrode lead may be separated by the pressure, or a portion where the other terminal end of the film-like connection member is attached to the second electrode lead may be separated by the pressure, thereby interrupting a charging current.

In addition, when the internal pressure of the pouch sheath material 12 is further increased by an additional reaction, the first sealing member 11 interposed between the first electrode lead 10 and the second electrode lead 10' is broken so that the internal part of the secondary battery may be opened. Thus, venting of gas occurs toward the exterior of the pouch-type secondary battery.

Herein, when the internal pressure of the pouch sheath material 12 exceeds a critical value, the first sealing member 11 is broken by the pressure so that the internal part of the secondary battery may be opened.

Meanwhile, it is shown in FIG. 2 that the first sealing member 11 is disposed at the outside of the pouch-type secondary battery as compared to the film-like connection member 13. However, the present disclosure is not limited thereto.

In other words, the first sealing member 11 may be disposed at the inside of the secondary battery as compared to the film-like connection member 13. In this case, when the internal pressure of the secondary battery exceeds a critical value, the first sealing member 11 is broken first, and then the film-like connection member 13 is broken or is separated at a portion where it is attached to one of the electrode leads 10, 10' when the internal pressure is further increased, thereby interrupting electric connection.

Figure 4:
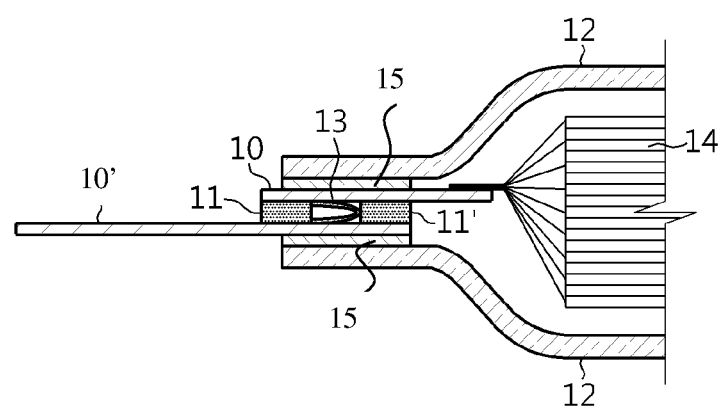
FIG. 4 shows the structure of a dual connected electrode lead portion according to another embodiment of the present disclosure.

FIG. 4 shows the structure of a dual connected electrode lead portion according to another embodiment of the present disclosure.

Referring to FIG. 4, when a first sealing member 11 is disposed at the outside of the pouch-type secondary battery as compared to the film-like connection member 13, the secondary battery may further include a second sealing member 11' disposed at the inside of the pouch-type secondary battery as compared to the film-like connection member 13 and interposed between the first electrode lead 10 and the second electrode lead 10' in order to prevent the first electrode lead 10 and the second electrode lead 10' from being in contact with each other.

Herein, the second sealing member 11' allows the pouch sheath material to be sealed more firmly. Particularly, the second sealing member functions to absorb the vibrational impact that may be applied to the film-like connection member 13, and thus prevents the film-like connection member 13 from being broken during the normal operation of the battery.

When the internal pressure of the pouch sheath material exceeds a critical value, the second sealing member 11' may be broken by the pressure, similarly to the first sealing member 11.

Meanwhile, the pouch-type secondary battery may further include a third sealing member 15 configured to facilitate sealing between the first pouch portion and the first electrode lead, and between the second pouch portion and the second electrode lead, respectively.

In addition, a sealing portion where the first pouch portion and the second pouch portion are adhered to each other, the first and the second sealing members configured to prevent electric contact between the first electrode lead and the second electrode lead, and the third sealing member 15 formed between each pouch portion and each electrode lead may include any material used currently in the art with no particular limitation, as long as the material has no conductivity.

Meanwhile, the cathode, anode, separator, electrolyte, pouch sheath material, or the like used herein may be easily obtained by the processes and/or methods known to those skilled in the art. The cathode, anode and separator forming the electrode-separator assembly may be those used generally for manufacturing lithium ion secondary batteries.

Particularly, the cathode may be obtained by applying a mixture containing a cathode active material, conductive agent and a binder onto a cathode collector, followed by drying. If necessary, the mixture may further include a filler.

In general, the cathode collector has a thickness of 3-500 µm. Any cathode collector may be used with no particular limitation, as long as it causes no chemical change in the corresponding battery and has high conductivity. Particular examples of the cathode collector include stainless steel, aluminum, nickel, titanium, sintered carbon, or aluminum or stainless steel whose surface is treated with carbon, nickel, titanium or silver. The collector may have fine surface irregularities to increase the adhesion of a cathode active material. The collector may have various shapes, such as a film, sheet, foil, net, porous body, foam or nonwoven body.

In general, the conductive agent is added in an amount of 1-50 wt % based on the total weight of the mixture including the cathode active material. Any conductive agent may be used with no particular limitation, as long as it causes no chemical change in the corresponding battery and has conductivity. For example, the conductive agent may include: graphite, such as natural graphite or artificial graphite; carbon black, such as carbon black, acetylene black, Ketjen black, channel black, furnace black, lamp black or thermal black; conductive fibers, such as carbon fibers or metal fibers; metal powder, such as fluorocarbon, aluminum or nickel powder; conductive whiskers, such as zinc oxide or potassium titanate; conductive oxides such as titanium oxide; or conductive materials such as polyphenylene derivatives.

The binder is an ingredient which helps the binding of an active material or conductive agent or the binding to the collector. In general, the binder is added in an amount of 1-50 wt % based on the total weight of the mixture including the cathode active material. Particular examples of the binder include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene monomer copolymer (EPDM), sulfonated EPDM, styrene-butyrene rubber, fluororubber, various copolymers, or the like.

The filler is used optionally as an ingredient inhibiting swelling of the cathode. Any filler may be used, as long as it causes no chemical change in the corresponding battery and is a fibrous material. Particular examples of the filler include olefin polymers, such as polyethylene or polypropylene; fibrous materials, such as glass fibers or carbon fibers; or the like.

In addition, the anode may be obtained by applying an anode material onto an anode collector, followed by drying. If necessary, the anode may further include the above-mentioned ingredients.

The anode collector generally has a thickness of 3-500 µm. Any anode collector may be used, as long as it does not cause any chemical change in a battery and has conductivity. For example, copper, stainless steel, aluminum, nickel, titanium, sintered carbon, or copper or stainless steel whose surface is treated with carbon, nickel, titanium or silver, or aluminum-cadmium alloy may be used as an anode collector. Similarly to the cathode collector, the anode collector may have fine surface irregularities to increase binding force of an anode active material, and may have various shapes, such as a film, sheet, foil, net, porous body, foam or nonwoven body.

As a separator configured to insulate the cathode and anode therebetween, both a generally known polyolefin-based separator and a composite separator including such an olefin-based substrate and an organic/inorganic composite layer formed thereon may be used with no particular limitation.

The electrode assembly having the above-mentioned structure is received in a pouch sheath material and an electrolyte is injected thereto to obtain a battery. The electrolyte used herein is a lithium salt-containing non-aqueous electrolyte including a non-aqueous electrolyte and a lithium salt.

Particular examples of the non-aqueous electrolyte may include aprotic organic solvents, such as N-methyl-2-pyrrolidinone, propylene carbonate, ethylene carbonate, butylene carbonate, dimethyl carbonate, diethyl carbonate, γ-butyrolactone, 1,2-dimethoxyethane, tetrahydroxy franc, 2-methyltetrahydrofuran, dimethyl sulfoxide, 1,3-dioxolane, formamide, dimethylformamide, dioxolane, acaetonitrile, nitromethane, methyl formate, methyl acetate, phosphoric acid triester, trimethoxymethane, dioxolane derivatives, sulforan, methylsulforan, 1,3-dimethyl-2-imidazolidinone, propylene carbonate derivatives, tetrahydrofuran derivatives, ether, methyl propionate, ethyl propionate, or the like.

In addition, the lithium salt may be one dissolved in the non-aqueous electrolyte with ease. Particular examples of the lithium salt include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, LiAlCl$_4$, CH$_3$SO$_3$Li, (CF$_3$SO$_2$)$_2$NLi, lithium chloroborane, lower aliphatic lithium carboxylate, lithium 4-phenylborate, imide, or the like.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

In addition, several terms, such as top and bottom, left and right and front and rear, showing a direction are used in the specification. However, it is apparent to those skilled in the art that such terms refer to relative positions for the sake of description and vary with the observation position of an observer or the configuration of each constitutional element.

What is claimed is:

1. A pouch-type secondary battery, comprising:
   an electrode assembly; and
   a pouch sheath material configured to receive the electrode assembly and comprising a first pouch portion and a second pouch portion, wherein the first pouch portion and the second pouch portion are adhered to each other by each sealing portion,
   the pouch-type secondary battery further comprising:
   a first electrode lead extended from the electrode assembly and attached to the first pouch portion;
   a second electrode lead attached to the second pouch portion and protruding out of the exterior of the pouch sheath material;
   a first sealing member interposed between the first electrode lead and the second electrode lead to prevent the first electrode lead and the second electrode lead from being in contact with each other; and
   a flexible film-like connection member adjacent to the first sealing member configured to connect the first electrode lead electrically with the second electrode lead,
   wherein one terminal end of the film-like connection member is attached to the first electrode lead and the other terminal end thereof is attached to the second electrode lead; and wherein the first sealing member is disposed at the outside of the pouch-type secondary battery as compared to the film-like connection member; and wherein a second sealing member is disposed at the inside of the pouch-type secondary battery as compared to the film-like connection member, such that the second sealing member is interposed between the first electrode lead and the second electrode lead in order to prevent the first electrode lead and the second electrode lead from being in contact with each other.

2. The pouch-type secondary battery according to claim 1, wherein when the internal pressure of the pouch sheath material exceeds a critical value, a portion where one terminal end of the film-like connection member is attached to the first electrode lead or a portion where the other terminal end of the film-like connection member is attached to the second electrode lead is separated by the pressure.

3. The pouch-type secondary battery according to claim 1, wherein when the internal pressure of the pouch sheath material exceeds a critical value, a predetermined portion of the film-like connection member is broken by the pressure.

4. The pouch-type secondary battery according to claim 1, wherein when the internal pressure of the pouch sheath material exceeds a critical value, the first sealing member is broken by the pressure.

5. The pouch-type secondary battery according to claim 1, wherein when the internal pressure of the pouch sheath material exceeds a critical value, the second sealing member is broken by the pressure.

6. The pouch-type secondary battery according to claim 1, which further comprises a third sealing member formed between the first pouch portion and the first electrode lead and between the second pouch portion and the second electrode lead, respectively.

* * * * *